(12) United States Patent  
Taylor

(10) Patent No.: US 9,347,574 B1  
(45) Date of Patent: May 24, 2016

(54) SELF ACTUATING WEATHER PROTECTIVE COVER

(71) Applicant: Taylor Innovations, L.L.C., Oklahoma City, OK (US)

(72) Inventor: Julian S. Taylor, Oklahoma City, OK (US)

(73) Assignee: Taylo Innovations LLC, Oklahoma City, OK (US)

( * ) Notice: Subject to any disclaimer, the term of this patent is extended or adjusted under 35 U.S.C. 154(b) by 0 days.

(21) Appl. No.: 13/856,999

(22) Filed: Apr. 4, 2013

Related U.S. Application Data

(60) Provisional application No. 61/620,101, filed on Apr. 4, 2012.

(51) Int. Cl.  
*F16K 15/14* (2006.01)

(52) U.S. Cl.  
CPC ..................................... *F16K 15/14* (2013.01)

(58) Field of Classification Search  
CPC ...................................................... F16K 15/14  
USPC ...................... 137/512, 512.3, 844, 846, 847, 137/551–559  
See application file for complete search history.

(56) References Cited

U.S. PATENT DOCUMENTS

| | | |
|---|---|---|
| 2,712,161 A | 7/1955 | Moss |
| 3,904,720 A | 9/1975 | Sjostrand |
| 4,524,805 A | 6/1985 | Hoffman |
| 4,800,116 A | 1/1989 | Ventimiglia et al. |
| 5,117,999 A | 6/1992 | Canzano et al. |
| 5,301,707 A | 4/1994 | Hofsteenge |
| 5,606,995 A * | 3/1997 | Raftis ............................ 137/846 |
| 5,727,593 A * | 3/1998 | Duer ............................. 137/846 |
| 5,876,282 A | 3/1999 | Kenny |
| 5,931,197 A * | 8/1999 | Raftis et al. .................... 137/847 |
| 6,089,260 A * | 7/2000 | Jaworski et al. ............... 137/512 |
| 6,092,551 A | 7/2000 | Bennett |
| 6,136,253 A | 10/2000 | Bennett |
| 6,367,505 B1 * | 4/2002 | Raftis et al. .................... 137/846 |
| 6,719,004 B2 * | 4/2004 | Huber et al. .................... 137/362 |
| 7,152,469 B2 * | 12/2006 | Milleker et al. ................ 73/262 |
| 8,561,851 B1 * | 10/2013 | Leonoff ......................... 222/215 |
| 2002/0029808 A1 * | 3/2002 | Friend et al. ................... 137/551 |
| 2007/0090122 A1 | 4/2007 | Zeypang |
| 2008/0135109 A1 * | 6/2008 | Bonne et al. ................... 137/493 |
| 2011/0108139 A1 | 5/2011 | Wright et al. |

* cited by examiner

*Primary Examiner* — Jessica Cahill  
(74) *Attorney, Agent, or Firm* — Hall Estill Attorneys at Law

(57) ABSTRACT

An environmental (weather) protective cover for a vent conduit. In accordance with some embodiments, a flexible body portion is adapted to cover a distal end of a vent conduit coupled to an upstream pressure source. A flap supported by the body portion has a flap slot opening. The body portion and the flap have a closed mode in which the vent conduit is sealed and an open mode in which the body portion and the flap slot opening are expanded when pressurized fluid discharging from the vent conduit is sufficient to flex the body portion and increase the slot opening to discharge the pressurized fluid. The body portion and the flap return to the closed mode when the pressurized fluid has been released.

18 Claims, 6 Drawing Sheets

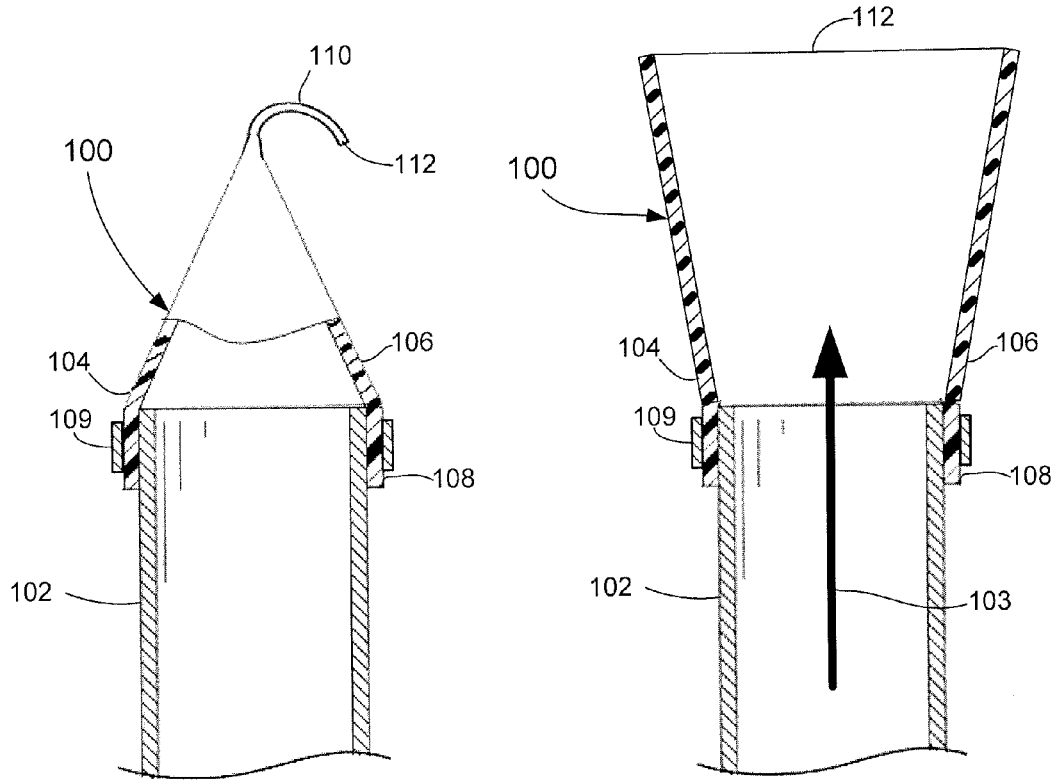
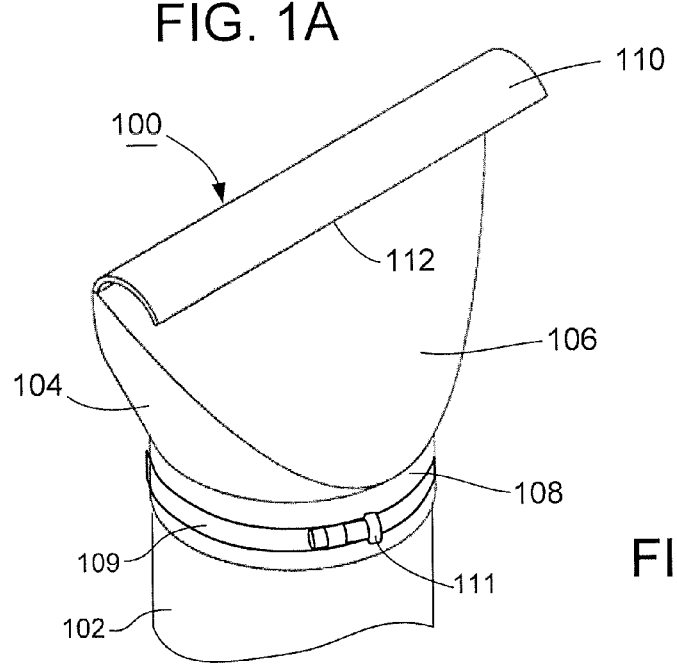
FIG. 1A    FIG. 1B
FIG. 2

OPEN CIRCUIT

CLOSED CIRCUIT

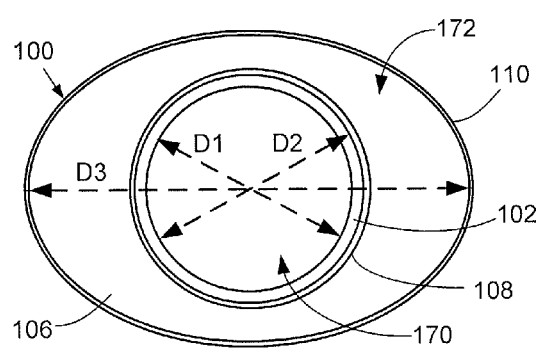
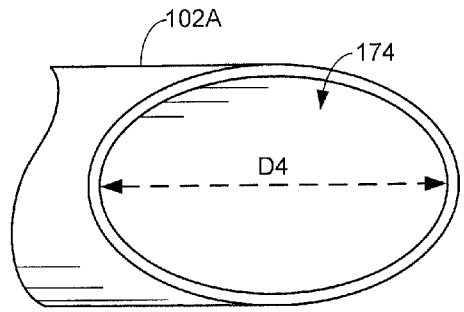
FIG. 13     FIG. 14A
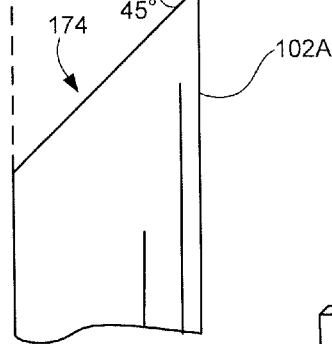
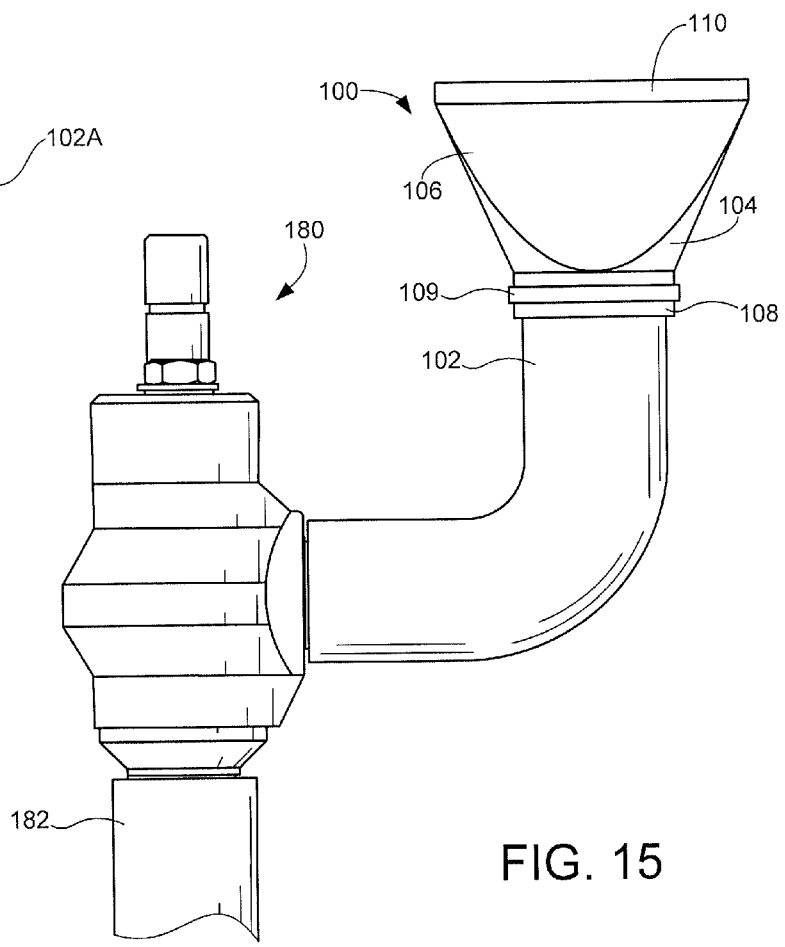
FIG. 14B
FIG. 15

US 9,347,574 B1

SELF ACTUATING WEATHER PROTECTIVE COVER

RELATED APPLICATIONS

This application makes a claim of domestic priority to U.S. Provisional Patent Application No. 61/620,101 filed Apr. 4, 2012, the contents of which are incorporated by reference.

BACKGROUND

This country's industry of transporting pressurized fluids, such as hydrocarbons and steam, has created a very large piping network that utilizes a host of valve configurations, including pressure relief valves, shutdown valves, blowdown valves, flapper valves, ball valves and pressure control valves.

It is often necessary to route the pressurized fluids to an alternative routing path, such as when fluids are blown down to the surrounding atmosphere to prevent hazardous overpressurization. Vent conduits that are provided for such events usually extend into the atmosphere and are subjected to the ambient year round weather cycle. It is known to provide removable protective weather covers on vertical vent conduits to prevent the inclusions of foreign matter such as frozen precipitation, dirt and animal nesting materials. It is also known to tether protective weather covers to the vent conduit so that a vent discharge event will not blow away the covers, the blown off cover serving to visually indicate vent discharge event.

While previously known weather protective covers are generally operable, such covers often require physical manipulation of the cover once the cover has been removed by the discharged fluid. Return to service of a blown off cover is often a difficult task, as access to the vent discharge location can require operating personnel to negotiate height and possibly other barriers to replace and/or reinstall the cover.

Thus, there is a continued need for improvements in weather protective covers that do not require replacement following vent discharge incidents and that do not substantively restrict the venting of fluid during a discharging event.

SUMMARY

Various embodiments of the present disclosure are generally directed to a self actuating environmental (weather) protective cover adapted to cover a distal end of a vent conduit.

In accordance with some embodiments, a flexible body portion is adapted to cover a distal end of a vent conduit coupled to an upstream pressure source. A flap supported by the body portion has a flap slot opening. The body portion and the flap have a closed mode in which the vent conduit is sealed and an open mode in which the body portion and the flap slot opening are expanded when pressurized fluid discharging from the vent conduit is sufficient to flex the body portion and increase the slot opening to discharge the pressurized fluid. The body portion and the flap return to the closed mode when the pressurized fluid has been released.

These and other features and advantages of various embodiments will become apparent from a review of the following detailed description in conjunction with a review of the accompanying drawings.

BRIEF DESCRIPTION OF THE DRAWINGS

FIG. 1A is partial cutaway of a self actuating environmental (weather) protective cover constructed in accordance with some embodiments, the weather protective cover mounted to the discharging end of a vent conduit and oriented in a closed mode.

FIG. 1B shows the cover of FIG. 1A in an open mode.

FIG. 2 is a top isometric view of the cover of FIG. 1A.

FIG. 13 is a top plan view of the weather protective cover of FIG. 1A mounted on the vent discharge in the open mode and illustrating the cover fully opened during a fluid discharging event.

FIGS. 14A-14B show a corresponding opening that can be generated by cutting the distal end of the vent conduit at 45 degrees.

FIG. 15 shows the environmental protective cover of FIGS. 1-3 in conjunction with an upstream pressure relief valve.

DETAILED DESCRIPTION

Without limitation, various embodiments of the present disclosure are generally directed to a self actuating environmental (weather) protective cover. As explained below, the cover is configured for attachment to a discharge end of a vent conduit located downstream from a pressure relief valve. The pressure relief valve is normally closed, and when activated, vents pressurized fluid through the vent conduit to the ambient atmosphere.

The protective cover is normally in a closed position to protect the end of the vent conduit from the surrounding environment. When activated, the cover self opens in response to the discharging fluid and self closes once the discharging event has terminated.

In some embodiments, the cover is further configured to provide an indication that there exists a low-level leak of fluid being discharged from the pressure relief valve. The indication can be audible and/or visual, such as via a whistle that provides a high pitched whistle as pressurized fluid passes through the cover, or an LED light signal which provides a visual light in response to the leaking fluid.

FIG. 1A shows a self actuating weather protective cover 100 constructed and operated in accordance with some embodiments. The cover 100 is mounted to an exhaust vent conduit 102, which in turn is coupled to an outlet port of an upstream pressure relief valve (not separately shown).

The cover 100 is shown in FIG. 1A in a normally closed mode to protect the open end of the exhaust vent conduit from environmental effects such as precipitation and debris. While the end of the vent conduit 102 is shown to extend in a direction normal to the sidewalls of the conduit (e.g., a 90° cut), other cut angles can be accommodated by the cover, including cut angles of 45 degrees.

Figure 3:
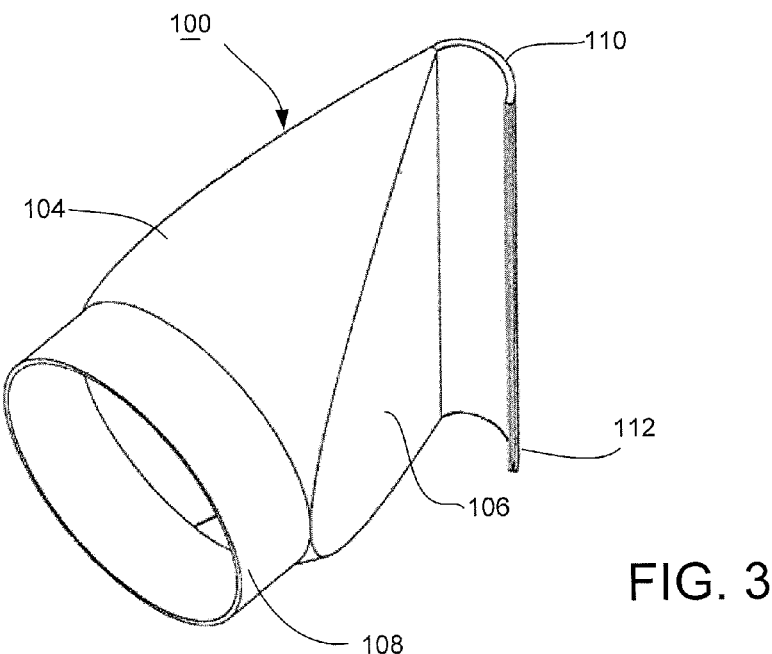
FIG. 3 is a bottom isometric view of the cover of FIG. 1A.

The cover 100 is shown in an open position in FIG. 1B to allow a flow of pressurized exhaust fluid, denoted by arrow 103, from the activated pressure relief valve, along the conduit 102, through the cover 100 and to the surrounding atmosphere. FIGS. 2-3 provide respective isometric views of the cover 100 in the closed position.

The cover 100 includes a body portion 104 that has a generally wedge shaped middle body portion 106 and a cylindrically shaped lower body portion 108 (best viewed in FIG. 3). The wedge shaped, middle body portion 106 tapers to a flap 110 which extends along the top of the cover and folds over as shown to provide a nominal seal. The flap 110 has a slit 112 that extends along the length of the flap and provides an open "mouth" for the cover when transitioned to the open position (FIG. 1B). The weight of the cover material, and the shape of the cover, will generally cooperate to urge the flap 110 back to the closed position of FIG. 1A when the internal pressure within the conduit returns to ambient pressure.

The internal diameter of the lower body portion 108 is selectively determined to grippingly fit over the outer diameter of the vent conduit 102 so that the protective weather cover 100 will remain in place on the conduit when subjected to the upward force of blow off pressurized fluid from the vent conduit 102 and to withstand the lateral ambient forces such as wind and rain. In some embodiments, the lower body portion 108 can be secured to the outer surface of the distal end of the vent conduit 102 using an attachment mechanism, such as a clamp ring 109 (best viewed in FIG. 2).

The clamp ring 109 is generally characterized as a "hose clamp" type mechanism with a threaded fastener 111 which, when rotated, tightens the ring to provide an inwardly directed compressive force upon the lower body portion 108. Depending on the configuration of the cover 100, no separate clamping mechanism may be necessary to secure the cover to the vent conduit. Using a threaded outer surface can increase the retention force between the body portion 108 and the conduit 102. In another embodiment, a suitable adhesive is applied to adhere the body portion to the conduit. Other suitable attachment mechanisms can be used for different applications.

It will be appreciated that the shape of the lower body portion 108 will usually be cylindrically shaped since most vent conduits on which the protective weather cover will be mounted will be cylindrically shaped, but such is merely exemplary and not limiting. The lower body portion 108 can be selected to conform to the external shape of the vent conduit when such conduit has an external shape that is not cylindrically shaped, such as in the instance of a conduit having rectangular or other polygonal cross-section. While external attachment to the vent is contemplated, such is not necessarily required.

The exemplary weather protective cover 100 has a unitary construction made of a durable and flexible material, such as plastisol or other elastomeric or polymeric material that is sufficiently rigid to hold its shape under a wide range of ambient conditions while being sufficiently flexible to assume an open mode when subjected to fluid discharge from the vent conduit (see arrow 103 in FIG. 1B). Components designed to extend the operational life of the cover and to protect the cover from environmental conditions, such as ultraviolet (UV) protective agents, can be incorporated into the flexible material used to form the cover.

Figures 4A, 4B:
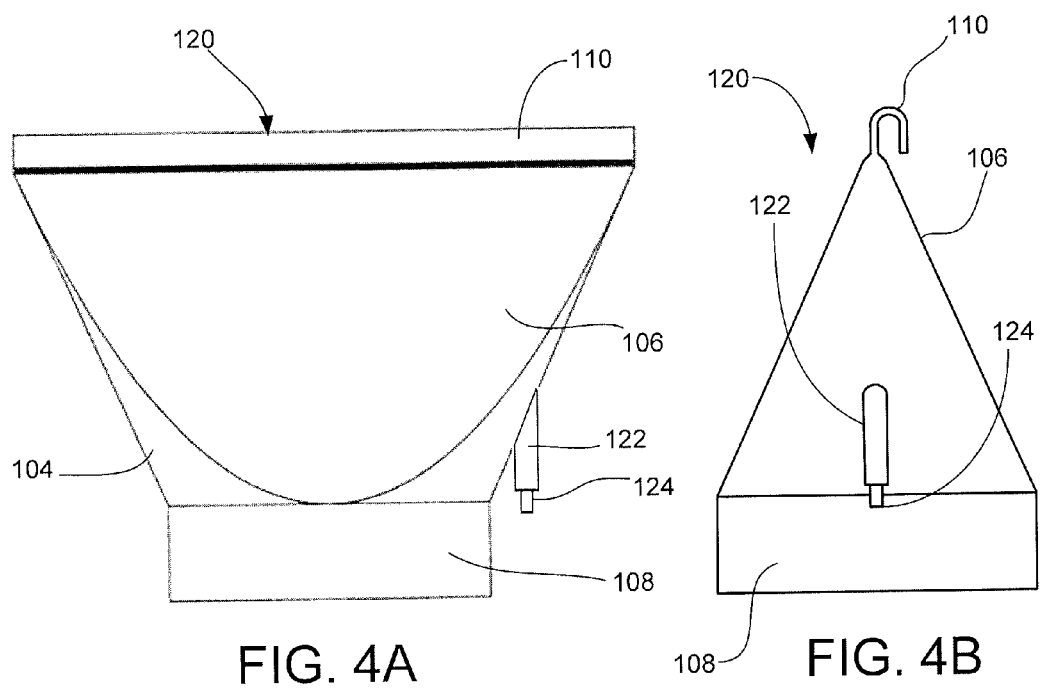
FIG. 4A is a front elevational view of another self actuating weather protective cover that incorporates an audible alarm to indicate a leak of fluid through an upstream valve.
FIG. 4B is a side elevational view of the cover of FIG. 4A.

FIGS. 4A-4B illustrate another protective cover 120 in accordance with some embodiments. The cover 120 is generally similar to the cover 100 of FIGS. 1-3, and like reference numerals have been provided for similar components. The cover 120 includes a tubular projection 122 which extends from the upper body portion 106 as shown.

Figure 5:
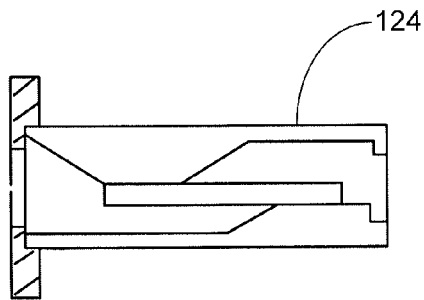
FIG. 5 depicts a whistle that can be incorporated into the cover of FIGS. 4A-4B.

The projection 122 is sized to accommodate a whistle 124, such as depicted in FIG. 5. The whistle serves to produce an audible sound in the range of human hearing when pressurized fluid is leaking from the upstream pressure relief valve at a rate that is insufficient to substantially open the flap 110. The leaking fluid will cause the whistle 110 to emit a high pitched squeal to alert operating personnel of the leaking pressure relief valve.

Figure 6:
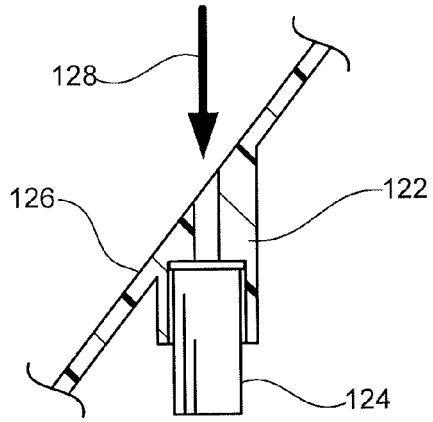
FIG. 6 shows the whistle of FIG. 5 installed in a projection of the cover of FIGS. 4A-4B.

The whistle 124 can be inserted into the tubular projection 122 as depicted in FIG. 6. The whistle 124 can be press-fit into the projection 122 to secure the whistle therein, or other mechanisms such as adhesive can be used to secure the whistle within the projection. While the projection 122 is shown to extend outside a sidewall 126 of the middle body portion 106, other configurations can be used. For example, the whistle 124 can be recessed within the interior of the cover 120 so that just a distal end of the whistle extends through the sidewall 126.

The presence of low pressure fluid within the interior of the cover 120, as depicted by arrow 128, will generally result in the generation of an audible response. It will be appreciated that if the flap 110 sufficiently seals the cover 120, a relatively loud audible response can be generated even in the presence of a relatively low leakage rate. It has been found in some cases that the audible response can be detected by human operators several tens of feet away or more from the cover 120.

Figure 7:
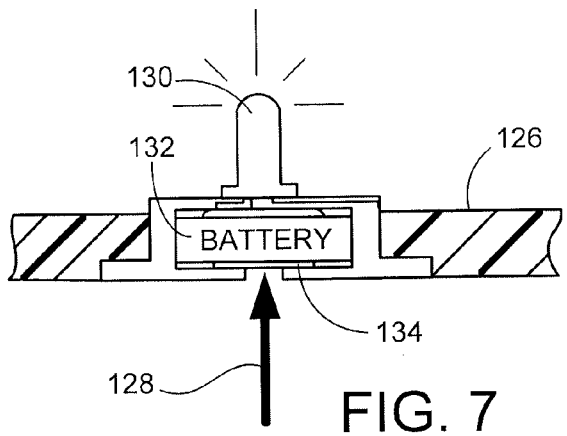
FIG. 7 shows a visual alarm mechanism that can be incorporated into the exemplary covers of FIG. 1A-1B or 4A-4B.
Figure 8A:
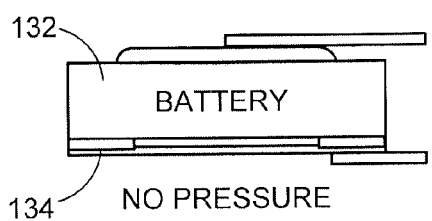
FIGS. 8A-8B show operation of aspects of the visual alarm mechanism of FIG. 7.
Figure 8B:
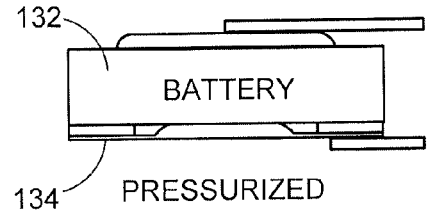

Indicia other than a whistle can be incorporated with the weather protective cover to detect a leak event, such as a light emitting element 130 (e.g., light emitting diode, LED) as shown in FIG. 7. The light emitting element 130 can be connected to a power source 132, such as a battery. A low force, spring biased pressure plate 134 can be adapted to close an electrical circuit responsive to the leaking fluid 128. This can induce current to flow from the power source 132 to the light emitting element 130, thereby generating a visual indication of the presence of a leak. FIGS. 8A-8B illustrate an exemplary operation of the pressure plate 134 both in an open circuit configuration (FIG. 8A) and a closed circuit configuration (FIG. 8B).

Figure 9:
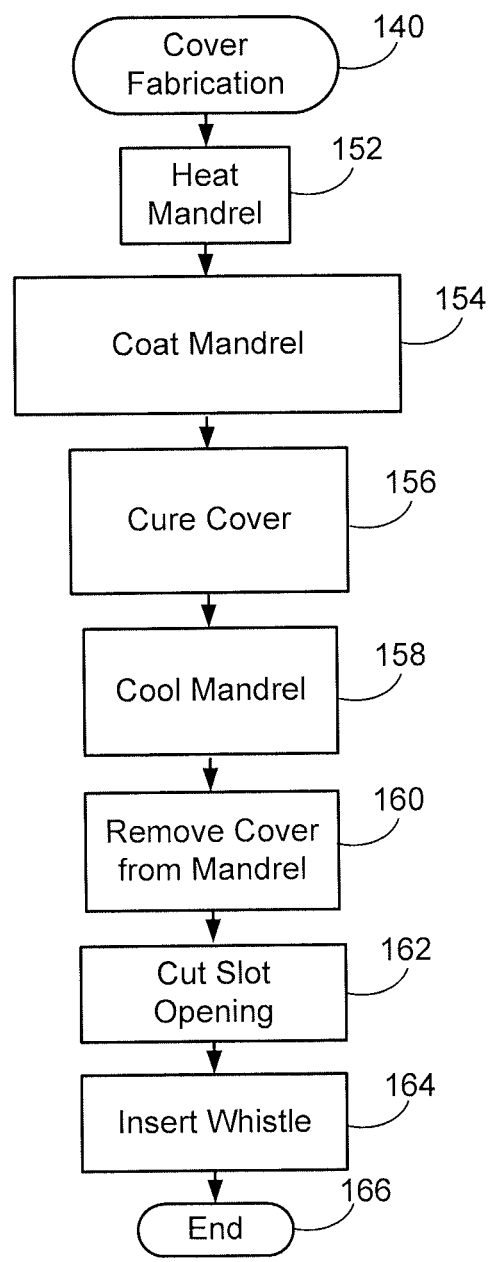
FIG. 9 is a flow chart illustrating exemplary steps that can be carried out to form a weather protective cover as depicted in FIGS. 1-4.

Turning to FIG. 9, a routine 140 is provided to illustrate steps that may be carried out in accordance with some embodiments to construct a weather protective cover as disclosed herein. While a variety of manufacturing processes may occur to the skilled artisan in view of the present disclosure, in some embodiments a dip-coating process is utilized whereby a mandrel (mold form) is repetitively dipped in a liquid solution and cured to form the basic shape of the cover.

Figure 10:
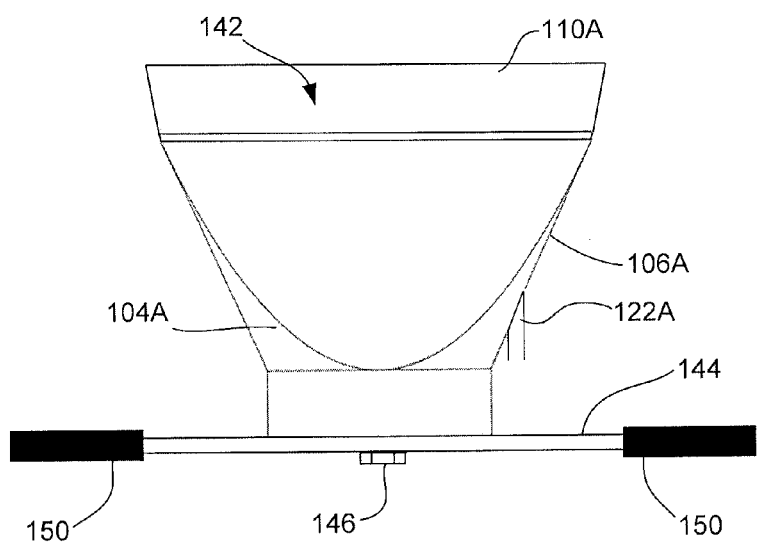
FIG. 10 is an elevational side view of a mandrel used in the method of FIG. 9.
Figure 11:
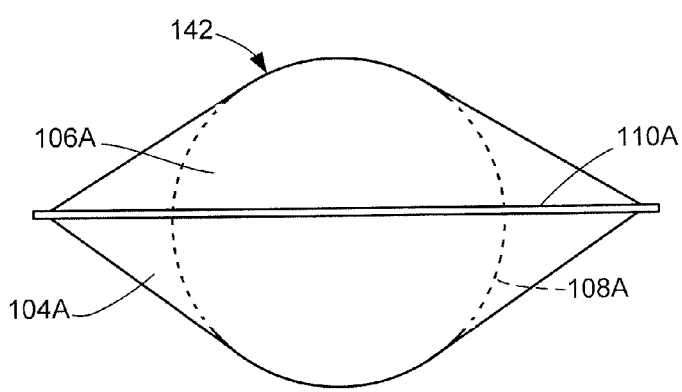
FIG. 11 is a top plan view of the mandrel of FIG. 10.
Figure 12:
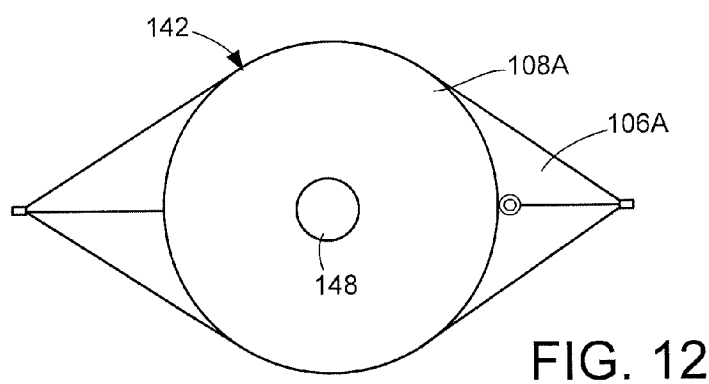
FIG. 12 is a bottom plan view of the mandrel of FIG. 10.

An exemplary mandrel suitable for this purpose is shown at 142 in FIGS. 10-12. The mandrel 142 is formed of a unitary solid and rigid material, such as aluminum, with suitable heat conductivity properties to facilitate the routine 140 of FIG. 9. The mandrel 142 takes an external shape corresponding to the desired internal shape of the protective cover 100, 120. To this end, the mandrel 142 includes a body portion 104A, a middle body portion 106A, a lower body portion 108A and upwardly extending flap flange 110A, each of these portions dimensioned to form the internal shape of the protective cover. Also, on one side of the middle body portion 106A is a projecting rod 122A that serves to form the projection 122 that will house the whistle 124, when included into the cover design.

A handle member 144 is secured to the mandrel 142 by a bolt 146 extending through the handle 144 to engage a threaded bore 148 in the lower body portion 108A (see FIG. 12). Insulated grips 150 can be provided for safe handling of the mandrel 142.

Referring again to the routine 140 of FIG. 9, the mandrel 142 is first heated to a suitable elevated temperature at step 152. This preparatory step may serve to facilitate the coating of the mandrel with the elastomeric material at step 154, as well as facilitate the subsequent oven curing of the material at step 156.

The coating step 144 involves dipping the heated mandrel 142 into a liquid bath of plastisol or other suitable material. Color additives may be added to the bath to achieve a desired final color for the cover, such as a high visibility color such as red.

An open lid multiple gallon container will suffice for the bath, the container filled to a sufficient depth to accept the inverted mandrel 142 such that the liquid line will reach substantially to the bottom of the mandrel as an operator, holding the handle 144, suspends the mandrel in contact with the plastisol for a short while as plastisol accumulates on the outer surface of the mandrel 142.

The mandrel is then removed from the plastisol bath and allowed to air dry momentarily above the bath. The mandrel can be dipped several times as necessary to acquire the desired thickness of plastisol on the mandrel. In some embodiments, one or more extra dipping steps are carried out that submerge just the flange portion 110A (FIG. 10) in order to achieve a slightly greater thickness for the flap 110 (FIG. 1A).

The oven curing step 156 involves placing the coated mandrel in a controlled heating environment, such as an oven set at a temperature of about 350 degrees for about 30 minutes. In step 158, the coated mandrel 142 is removed from the heating environment and allowed to cool to substantially ambient temperature. This cooling step will vary, but it is typically several minutes until the mandrel is sufficiently cool for handling.

In step 158, the plastisol coating is removed from the cooled mandrel, and step 160 calls for trimming a small portion from the distal end 112 (FIG. 1A) to form a slot opening that communicates with the internal of the plastisol coating. If the protective cover is to be provided with an audible and/or visual indicator, such as the whistle 124, the end of the coating that has formed on the rod 122A is also trimmed to provide the projection 122, and the whistle is inserted therein at step 164. The process then ends at step 166.

Once the protective cover 100 is formed, such as by the process above described, it is ready for using by fitting the lower body portion 108 over the conduit end 102. Usually, the conduit 102 will extend skyward, and once the protective cover 100 is mounted thereon, the flap 110 may bend over by gravity to assume the curvilinearly downward bending shape shown in FIGS. 1-2.

The downward projection of the flap 110 is beneficial, as this positions the slot opening in the distal end 112 down and partially shielded from the ambient overhead, preventing entry of downwardly directed foreign materials, such as rain or bird droppings. To achieve this downwardly directed projection of the flap 110, additional coating material may be needed on the flap flange 110A by coating it with additional plastisol during coating step 154.

The desired shaping of the flap 110 may also be achieved by subsequently heating the flap 110 and allowing it to cool while holding the flap material in a desired, "folded over" orientation so that the cooled flap 110 will assume and maintain the downward curving profile depicted in FIG. 1A. A suitable fixture can be used during these steps.

In a pressure blow-off event in which the upstream pressure reducing valve opens to discharge pressurized fluid from the conduit 102, the truncated shape of the middle body portion 106 of the covers 100, 120 advantageously causes the walls thereof to open in response to the discharging fluid to form the upwardly extending cross section depicted in FIG. 1A as the pressure of discharging fluid flow impinges on and opens the slot in the flap end 112. This results in the flexing of the walls 126 of the protective cover 100, 120 to present an enlarged opening, as depicted in the top view representation of FIG. 13.

In this open mode, the opening of the slot opening in flap end 112 will be substantially larger than the cross sectional opening of the conduit 102. More specifically, the opening of the distal end of the conduit 102 is denoted in FIG. 13 at 170, and this opening has an innermost diameter D1. The lower cylindrical portion 108 of the cover main body contactingly engages an outer circumferential wall of the distal end of the conduit 102, and has a slightly larger diameter D2. The flap end 112, when fully open, provides a generally elliptical cross-sectional area 172 having a long axis overall diameter D3. The diameter D3 is larger than D1 and D2, thereby allowing substantially complete and free access of the escaping fluid from the distal end of the conduit 102 to the surrounding environment. It will be noted that the diameter D3 generally corresponds to the overall lateral length of the flap 110 (see e.g., FIG. 2) when the flap is in the closed orientation.

It can be accordingly seen that the cover 100 can be attached to vent conduits with 90° cuts and provide a substantially larger overall outlet opening through the flap end 112, in a manner similar to the way in which larger vent openings can be achieved by cutting the distal end of the vent conduit at a non-orthogonal angle such as 45°

More specifically, FIGS. 14A-B show a vent conduit 102A with a 45 degree cut at the distal end thereof to provide an elliptical opening 174 with long axis diameter D4. It is contemplated, although not necessarily required, that the diameter D3 of the open flap 110 in FIG. 13 will be larger than the diameter D4 of the cut vent conduit 102A, so that the cover 100 provides a larger exhaust opening (area 172) than what can be achieved via the opening 174. This can provide additional benefits as well, such as potentially reducing vibrations and other standing wave phenomena present in an existing discharge system without requiring modifications to the existing conduit network. Moreover, the cover can provide specifically tailored cross-sectional openings for particular applications to provide optimal fluidic vent response characteristics.

Once a blow-off incident is over and the upstream back pressure valve has closed, the fluid pressure on the protective cover 100 ends, and the protective cover self closes; that is, it returns to its normal closed mode as the protective cover is subjected only to ambient conditions. That is, with the pressure blow-off incident ended, the protective cover 100 will return to its closed mode depicted in FIGS. 1A, 2-3, once again serving to cover the opening of the vent conduit 102 until the occasion of another pressure blow-off incident. Of course, if the blow off valve is leaking and the pressure buildup against the protective cover is insufficient to flex the protective cover to its open mode, the pressure will blow the whistle, provide a visual indication, etc. so that operating personnel will be notified of the leak and the blow off valve can be serviced.

FIG. 15 shows an exemplary arrangement of the cover 100 of FIGS. 1-3 in conjunction with a pressure relief valve 180. The valve 180 is configured as a normally closed pressure relief valve of the type having an internal valve member, such as a reciprocal piston or plunger (not shown), which forms a fluid tight seal against a valve seat. A biasing member, such as an internal coiled spring (also not shown), normally maintains the valve member against the valve seat.

Inlet fluid, such as a pressurized gas, is presented to an inlet port of the valve 180 and bears against a facing surface of the valve member. At such time that the upwardly directed force from the inlet fluid exceeds the downwardly directed biasing force from the biasing member, the valve member transitions to an open position and a portion of the pressurized fluid passes through the body of the valve and out the vent conduit 102. The vented fluid opens the cover 100 and passes to the exterior atmosphere as described above.

While a normally closed pressure relief valve is depicted in FIG. 15, it will be appreciated that other types of pressure sources can be connected upstream to the protective cover, such as but not limited to storage tanks, etc. The relative sizes and spacings of the various elements in FIG. 15 can vary depending on the requirements of a given application. It is contemplated that environmental protective covers as exemplified herein can be adapted for any number of different sizes of vent conduits.

The various embodiments of the present disclosure set forth a number of benefits over the prior art. The exemplified weather protective cover self-opens during a pressure blow-off incident, and recloses at the termination of the pressure blow-off event. Should the pressure reducing valve leak fluid to a pressure insufficient to open the protective cover, the whistle will provide an audible sensory indication of the presence of a pressure leak.

Further features, aspects and advantages of the various embodiments can be understood from a review of the description in view of the accompanying drawings and appended claim.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a flexible body portion adapted to cover a distal end of a vent conduit coupled to an upstream pressure source, the flexible body portion having a cylindrically shaped lower body portion and a wedge shaped middle body portion, the wedge shaped middle body portion having opposing flat planar surfaces which taper to a distal end of the flexible body portion and opposing curvilinear side surfaces, the flat planar surfaces bounded by substantially parabolically shaped edges from which the curvilinear side surfaces extend; and
   a flap supported by the distal end of the flexible body portion and having a linearly extending flap slot opening aligned with the flat planar surfaces, the wedge shaped middle body portion and the flap having a closed mode in which the vent conduit is sealed and an open mode in which the wedge shaped middle body portion and the flap slot opening are expanded when pressurized fluid discharging from the vent conduit is sufficient to flex the wedge shaped middle body portion and increase the slot opening to discharge the pressurized fluid, the wedge shaped middle body portion and the flap returning to the closed mode when the pressurized fluid has been released, wherein the flap is folded over upon itself in the closed mode, and expanded to form a curvilinear cross-sectional shape in the open mode.

2. The apparatus of claim 1, in which the cylindrically shaped lower body portion has a first interior cross-sectional area adapted to contactingly engage the distal end of the conduit, and the flap slot opening is expandable to a second interior cross-sectional area larger than the first interior cross-sectional area.

3. The apparatus of claim 1, in which the apparatus is formed of an elastomeric or polymeric material.

4. The apparatus of claim 1, further comprising a whistle coupled to the flexible body portion adapted to emit an audible sound responsive to a leak of pressurized fluid passing through the vent conduit from the pressure source.

5. The apparatus of claim 1, further comprising a light emitting element coupled to the flexible body portion adapted to emit a visual indication responsive to a leak of pressurized fluid passing through the vent conduit from the pressure source.

6. The apparatus of claim 1, in which the pressure source comprises a normally closed pressure relief valve.

7. The apparatus of claim 1, in which the flexible body portion and the flap are formed by dipping a heated mandrel into an elastomeric solution to coat the mandrel with a layer of elastomeric material, curing the elastomeric material, and removing the cured elastomeric material from the mandrel, and in which the flap slot opening is formed by cutting a distal end of the cured elastomeric material.

8. The apparatus of claim 1, in which the cylindrical lower body portion has a first overall diameter sized to contactingly seal against the distal end of the vent conduit, the wedge shaped middle body portion extending from the lower body portion to the flap, wherein the flap slot opening, when closed, has an overall length greater than the first overall diameter and wherein the flap slot opening, when fully open, forms an elliptical cross-sectional opening with a second overall diameter greater than the first overall diameter.

9. The apparatus of claim 8, in which the elliptical cross-sectional opening of the flap is larger than a second elliptical cross-sectional opening that would be achieved by cutting off a portion of the distal end of the conduit at an angle of 45 degrees.

10. An apparatus comprising:
    a cylindrical vent conduit connected to an upstream pressure source to vent pressurized fluid from said source responsive to an overpressure condition, the vent conduit having a vent axis extending in a first direction; and
    an environmental protective cover connected to a distal end of the vent conduit, comprising:
       a cylindrical lower body portion adapted to contactingly seal against the distal end of the vent conduit;
       a tapered main body portion which extends from the cylindrical lower body portion and terminates at a flap which extends in a second direction perpendicular to the first direction, the tapered main body portion comprising opposing first and second planar flat surfaces each bounded by a parabolically extending edge with a midpoint adjacent the cylindrical lower body portion and opposing first and second curvilinear end surfaces which adjoin the respective parabolically extending edges of the first and second planar flat surfaces, the flap having a linearly extending flap slot opening aligned with the first and second planar flat surfaces, wherein the main body portion is formed of a flexible material so that the flap slot opening is in a normally closed orientation, and wherein responsive to a discharge of pressurized fluid from the distal end of the vent conduit the flap slot opening transitions to a temporarily open orientation to facilitate passage of the discharge of pressurized fluid to an external environment, wherein the flap self-folds to establish the normally closed orientation and the flap unfolds to transition to the open orientation.

11. The apparatus of claim 10, in which the flap slot opening, when in the open position, has a cross-sectional area greater than a cross-sectional area of the distal end of the vent conduit.

12. The apparatus of claim 10, in which the environmental protective cover further comprises a whistle coupled to the main body portion and adapted to emit an audible sound responsive to a leak of pressurized fluid passing through the vent conduit from the pressure source.

13. The apparatus of claim 10, in which the environmental protective cover further comprises a light emitting element coupled to the main body portion and adapted to emit a visual indication responsive to a leak of pressurized fluid passing through the vent conduit from the pressure source.

14. The apparatus of claim 10, in which the pressure source comprises a normally closed pressure relief valve, the environmental protective cover sealing the distal end of the vent conduit against the external environment when the pressure relief valve is in a closed position, and the environmental protective cover venting pressurized fluid from the pressure relief valve when said valve is in an open position.

15. An apparatus comprising an environmental protective cover adapted to cover a distal end of a vent conduit, the environmental protective cover comprising a cylindrical lower body portion adapted to contactingly engage the distal end of the vent conduit and a tapered main body portion which extends from the cylindrical lower body portion and terminates at a flap which extends in a second direction perpendicular to a first direction, the flap having a linearly extending flap slot opening, wherein the main body portion is formed of a flexible material so that the flap slot opening is in a normally closed orientation, wherein responsive to a discharge of pressurized fluid from the distal end of the vent conduit the flap slot opening transitions to a temporarily open orientation to facilitate passage of the discharge of pressurized fluid to an external environment, wherein the flap self-closes at a conclusion of the discharge of pressurized fluid to transition back to the normally closed orientation, wherein the main body portion comprises opposing first and second planar flat surfaces each bounded by a parabolically extending edge with a midpoint adjacent the cylindrical lower body portion and opposing first and second curvilinear end surfaces which adjoin the respective parabolically extending edges of the first and second planar flat surfaces, and wherein the linearly extending flap slot opening is parallel with the first and second planar flat surfaces, wherein the flap self-folds to establish the normally closed orientation and the flap unfolds to transition to the open orientation.

16. The apparatus of claim 15, wherein the cylindrical lower body portion has a first overall diameter, and the flap slot opening, when in the open orientation, has a second overall diameter greater than the first overall diameter.

17. The apparatus of claim 15, wherein the cylindrical lower body portion has a first overall diameter, and the flap has an overall length greater than the first overall diameter.

18. The apparatus of claim 15, further comprising a clamp which secures the cylindrical lower body portion in contacting engagement against an outer surface of the distal end of the vent conduit.

* * * * *